United States Patent
Hsu et al.

(10) Patent No.: US 10,991,520 B2
(45) Date of Patent: Apr. 27, 2021

(54) KEY STRUCTURE AND KEYBOARD USING THE SAME

(71) Applicants: LITE-ON ELECTRONICS (GUANGZHOU) LIMITED, Guangzhou (CN); LITE-ON TECHNOLOGY CORPORATION, Taipei (TW)

(72) Inventors: Kuo-Hui Hsu, Taipei (TW); Cheng-Kun Liao, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/896,886

(22) Filed: Jun. 9, 2020

(65) Prior Publication Data
US 2020/0402747 A1 Dec. 24, 2020

Related U.S. Application Data

(60) Provisional application No. 62/863,251, filed on Jun. 18, 2019.

(30) Foreign Application Priority Data

May 15, 2020 (CN) .......................... 202010410770.9

(51) Int. Cl.
*H01H 3/12* (2006.01)
*H01H 13/14* (2006.01)
(Continued)

(52) U.S. Cl.
CPC ............ *H01H 3/125* (2013.01); *G02B 6/0036* (2013.01); *G02B 6/0055* (2013.01); *G06F 3/0202* (2013.01); *H01H 13/14* (2013.01); *H01H 13/704* (2013.01); *H01H 13/705* (2013.01); *H01H 13/7057* (2013.01); *H01H 13/785* (2013.01); *H01H 13/83* (2013.01);
(Continued)

(58) Field of Classification Search
CPC ...... H01H 13/10; H01H 13/14; H01H 13/785; H01H 13/83; H01H 13/023; H01H 13/70; H01H 13/704; H01H 2233/07; H01H 13/7057; H01H 13/705; H01H 3/125; H01H 13/04; H01H 13/20; H01H 2223/034; H01H 2233/002; H01H 2239/032; H01H 2223/056; H01H 2233/01
See application file for complete search history.

(56) References Cited

U.S. PATENT DOCUMENTS

| | | | | |
|---|---|---|---|---|
| 2014/0090966 A1* | 4/2014 | Yu | ......................... | G06F 1/1662 200/5 A |
| 2014/0218890 A1* | 8/2014 | Wang | .................. | G02B 6/0055 362/23.03 |
| 2015/0332874 A1* | 11/2015 | Brock | .................... | H01H 13/83 200/5 A |

\* cited by examiner

Primary Examiner — Ahmed M Saeed
(74) Attorney, Agent, or Firm — Innovation Counsel LLP

(57) ABSTRACT

A key structure and a keyboard using the same are disclosed. The key structure includes a bottom plate, a keycap, a lifting mechanism, a backlight module, a fixer and a fixing portion. The lifting mechanism pivotally connects the bottom plate and the keycap. The backlight module is disposed on the bottom plate and is provided with a through hole, a first surface and a second surface opposite to the first surface. The through hole is extended to the second surface from the first surface. The fixer presses the first surface. The fixing portion presses the fixer on the bottom plate.

16 Claims, 6 Drawing Sheets

(51) Int. Cl.
*H01H 13/785* (2006.01)
*H01H 13/83* (2006.01)
*F21V 8/00* (2006.01)
*G06F 3/02* (2006.01)
*H01H 13/704* (2006.01)
*H01H 13/7057* (2006.01)
*H01H 13/705* (2006.01)

(52) U.S. Cl.
CPC ..... *G02B 6/0073* (2013.01); *H01H 2203/052* (2013.01); *H01H 2219/039* (2013.01); *H01H 2221/058* (2013.01); *H01H 2229/044* (2013.01)

KEY STRUCTURE AND KEYBOARD USING THE SAME

This application claims the benefit of U.S. provisional application Ser. No. 62/863,251, filed Jun. 18, 2019, the subject matter of which is incorporated herein by reference, and claims the benefit of People's Republic of China application Serial No. 202010410770.9, filed on May 15, 2020, the subject matter of which is incorporated herein by reference.

BACKGROUND OF THE INVENTION

Field of the Invention

The invention relates in general to a key structure and a keyboard using the same, and more particularly to a key structure with fixer and a keyboard using the same.

Description of the Related Art

The conventional light emitting keyboard is normally provided with a backlight module, which includes elements such as light guide plate and light source. When the light outputted by the light source enters the light guide plate, the light guide plate guides the light to the keycap of a light emitting keyboard. Normally, the light emitting keyboard and a casing are fixed by a fixer. For the fixer to be disposed, the light guide plate must be provided with a through hole for installing or receiving the fixer. However, since the fixer and the keycap overlap along a vertical direction, the light transmitted in the light guide plate will be blocked by the fixer, and the amount of the light entering the keycap will be reduced. Therefore, it has become a prominent task for the industries to provide a new key structure capable of resolving the above problems.

SUMMARY OF THE INVENTION

The invention is directed to a key structure and a keyboard using the same capable of resoling the above problems.

According to one embodiment of the present invention, a key structure is disclosed. The key structure includes a bottom plate, a keycap, a lifting mechanism, a backlight module, a fixer and a fixing portion. The lifting mechanism pivotally connects the bottom plate and the keycap. The backlight module is disposed on the bottom plate and is provided with a through hole, a first surface and a second surface opposite to the first surface. The through hole is extended to the second surface from the first surface. The fixer presses the first surface. The fixing portion presses the fixer on the bottom plate.

According to another embodiment of the present invention, a keyboard is disclosed. The keyboard includes a key structure, a casing and a fixing member. The key structure includes a bottom plate, a keycap, a lifting mechanism, a backlight module, a fixer and a fixing portion. The lifting mechanism pivotally connects the bottom plate and the keycap. The backlight module is disposed on the bottom plate and is provided with a through hole, a first surface and a second surface opposite to the first surface. The through hole is extended to the second surface from the first surface. The fixer presses the first surface. The fixing portion presses the fixer on the bottom plate. The fixing member fixes the casing and the fixer of the key structure.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the present invention are disclosed below with accompanying drawings and specific embodiments for exemplary purpose, not for limiting the scope of the present invention.

Figure 1:
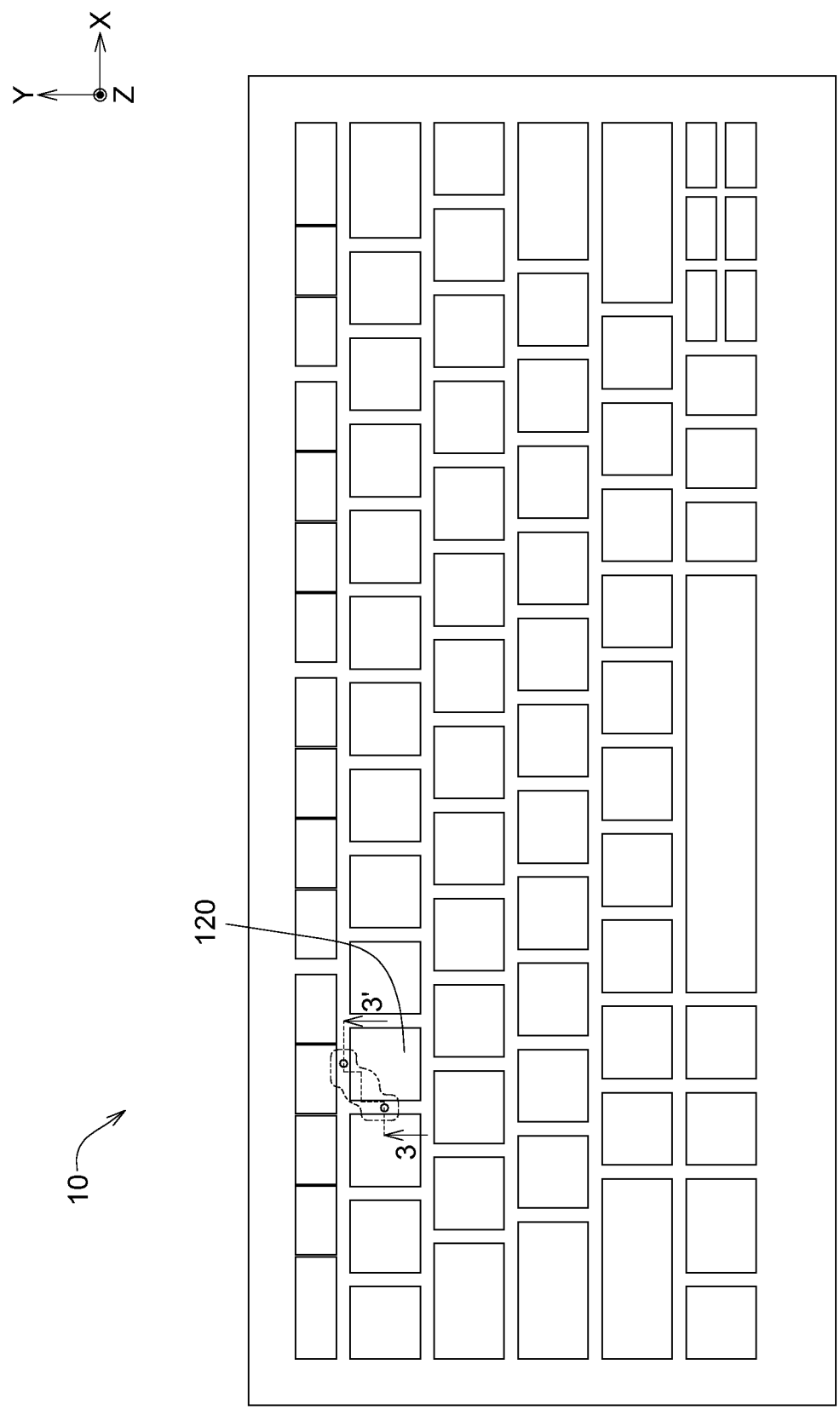
FIG. 1 is a top view of a keyboard according to an embodiment of the present invention.

The keyboard 10 can selectively be connected to the keyboard of a computer or integrated in the keyboard of a notebook computer. As indicated in FIG. 1, the keyboard 10 includes a key structure 100, a casing 11 and at least one fixing member 12. The casing 11 and the key structure 100 are fixed by such as the fixing member 12. In an embodiment, the fixing member 12 is a screw element, which passes through the casing 11 to be screwed on the key structure 100 to fix the relative position between the casing 11 and the key structure 100.

Figure 2:
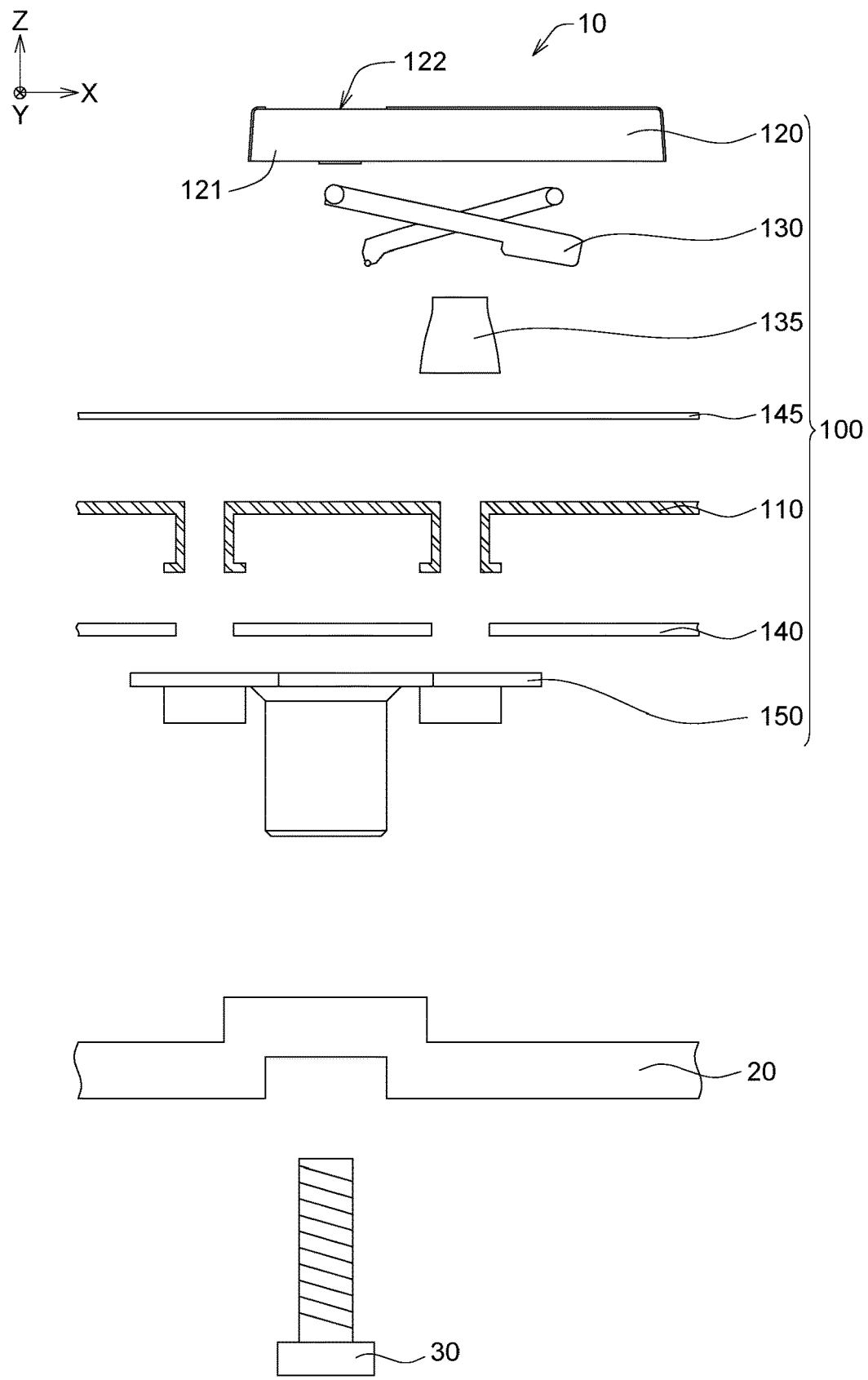
FIG. 2 is an explosion diagram of the keyboard of FIG. 1.
Figure 3:
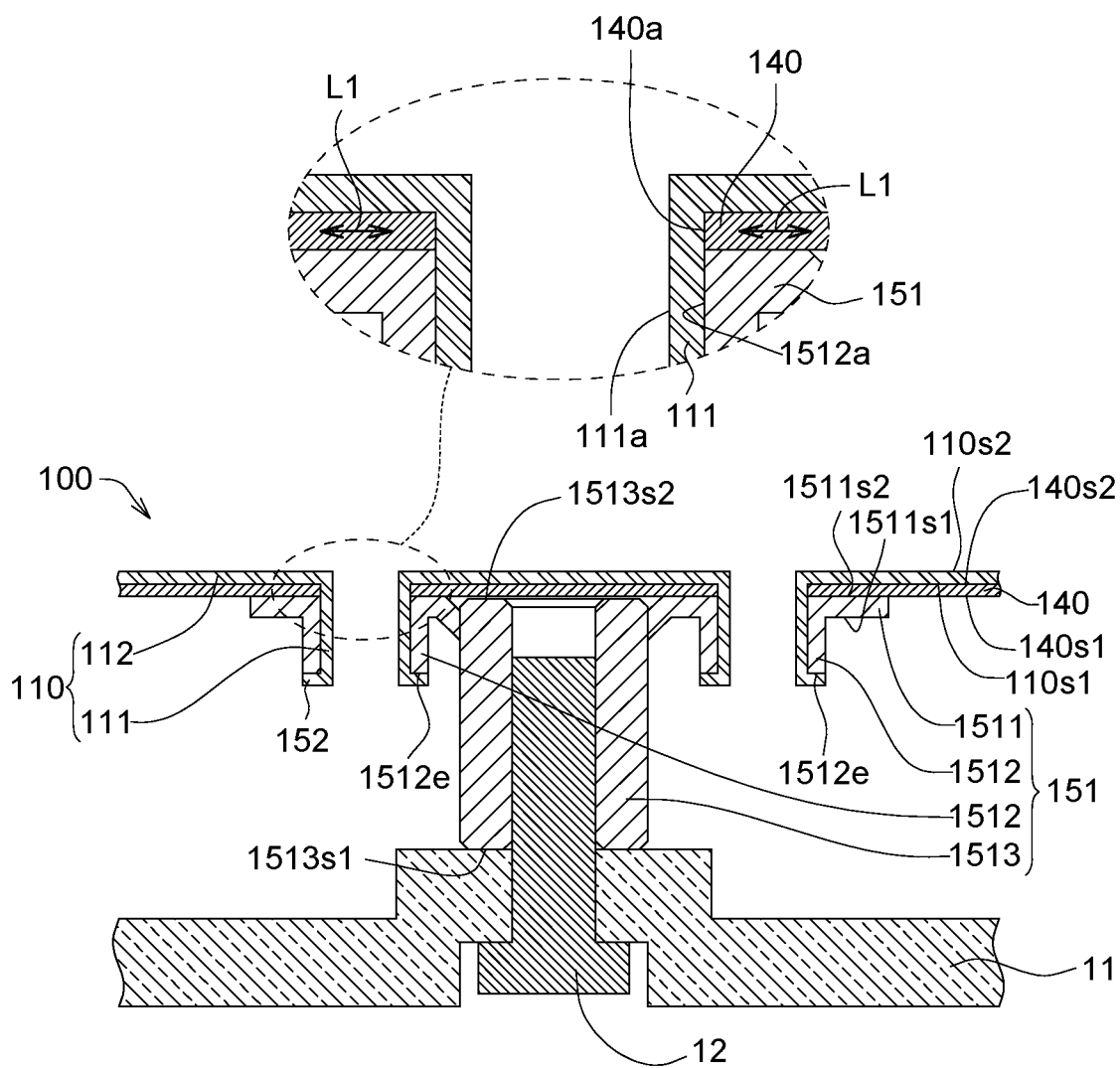
FIG. 3 is a partial cross-sectional view of the assembled keyboard of FIG. 1 along a direction 3-3'.

As indicated in FIGS. 2 and 3, the key structure 100 includes a bottom plate 110, at least one keycap 120, at least one lifting mechanism 130, and at least one elastomer 135, a backlight module 140, a thin-film switch layer 145, at least one fixer 151 and at least one fixing portion 152. The lifting mechanism 130 pivotally connects the bottom plate 110 and the keycap 120. The backlight module 140 is disposed on the bottom plate 110 and is provided with a through hole $140a$, a first surface $140s1$ and a second surface $140s2$ opposite to the first surface $140s1$. The through hole $140a$ is extended to the second surface $140s2$ from the first surface $140s1$. The fixer 151 presses the first surface $140s1$, and the fixing portion 152 presses the fixer 151 on the bottom plate 110. Since the fixer 151 presses the first surface $140s1$ instead of passing through the backlight module 140, the fixer 151 will not block the light L1 laterally transmitted in the backlight module 140 (such as along the XY direction) and will increase the amount of the light L1 which is laterally transmitted in the backlight module 140 to enter the keycap 120. In the present specification, the XY plane is perpendicularly to the Z-axial direction. The Z-axial direction, such as the lifting direction of the lifting mechanism 130, is substantially perpendicular to the XY plane.

In an embodiment of the present invention, the key structure 100 includes at least one key unit; in each key unit, the lifting mechanism 130 pivotally connects a keycap 120 and the bottom plate 110, and an elastomer 135 is interposed between the keycap 120 and the bottom plate 110.

The bottom plate 110, such as a metal bottom plate or a carbon fiber bottom plate, is configured to carry and support the keycap 120, the lifting mechanism 130, the elastomer 135 and the thin-film switch layer 145. As indicated in FIGS. 2 and 3, the bottom plate 110 includes at least one positioning column 111 and a plate body 112. The plate body 112 is provided with a first surface 110s1 and a second surface 110s2 opposite to the first surface 110s1, and the positioning column 111 is protruded with respect to the first surface 110s1. The positioning column 111 can pass through the fixer 151 to limit the relative position between the bottom plate 110 and the fixer 151. As indicated in FIG. 2, the keycap 120 includes a body 121 and a light transmitting portion 122. The light emitted from the backlight module 140 can be outputted through the light transmitting portion 122. The light transmitting portion 122 is provided with a pattern, such as a number pattern, a letter pattern, a word pattern, a mathematical symbol or a combination thereof. The lifting mechanism 130, such as a scissor foot mechanism, can move up and down with respect to the bottom plate 110 and drive the keycap 120 to move in the same manner. The elastomer 135 is interposed between the keycap 120 and the thin-film switch layer 145. When the key structure 100 changes to a press state from a free state (non-press state), the elastomer 135 is deformed and stores an elastic potential energy. When the key structure 100 is released from the press state, the elastomer 135 releases the elastic potential energy which restores the key structure 100 to the free state. When the key structure 100 is in the press state, the elastomer 135 triggers a circuit switch (not illustrated) of the thin-film switch layer 145, and a processor (not illustrated) electrically connected to the key structure 100 will perform a corresponding function. In an embodiment, the elastomer 135 can be formed of rubber. The thin-film switch layer 145 and the backlight module 140 respectively are disposed on two opposite sides of the bottom plate 110. For example, the thin-film switch layer 145 is disposed on one side of the bottom plate 110 facing the elastomer 135, and the backlight module 140 is disposed on the other side of the bottom plate 110 facing the casing 11. In terms of the assembly method, the backlight module 140 and the bottom plate 110 can be adhered by an adhering member (not illustrated), such as a double-sided tape.

Figure 4:
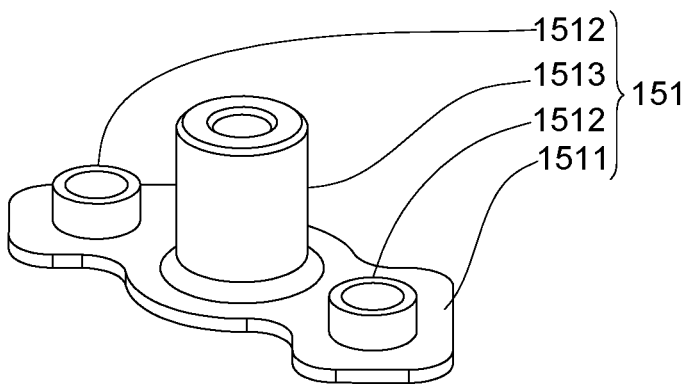
FIG. 4 is a schematic diagram of the fixer of FIG. 2.

As indicated in FIGS. 3 and 4, the entire fixer 151 is located beside the first surface 140s1 of the backlight module 140. For example, the entire fixer 151 is interposed between the backlight module 140 and the casing 11. The fixer 151 further includes a pressing plate 1511 and at least one positioning column 1512. The pressing plate 1511 may press or may directly contact the first surface 140s1. To put it in greater details, the pressing plate 1511 is provided with a first surface 1511s1 and a second surface 1511s2 opposite to the first surface 1511s1. The second surface 1511s2 of the pressing plate 1511 presses the first surface 140s1 of the backlight module 140. For example, the entire second surface 1511s2 presses the first surface 140s1 of the backlight module 140 to tightly press the backlight module 140 on the bottom plate 110. Since the pressing plate 1511 and the positioning column 1512 do not pass through the backlight module 140, the pressing plate 1511 and the positioning column 1512 will not block the light L1 laterally transmitted in the backlight module 140.

As indicated in FIGS. 3 and 4, the positioning column 1512 is protruded from the pressing plate 1511. For example, the positioning column 1512 is protruded with respect to the first surface 1511s1 of the pressing plate 1511. The positioning column 1512 is provided with a positioning hole 1512a, which is extended to the end surface 1512e of the positioning column 1512 from the second surface 1511s2. The positioning column 1512 is mounted on the positioning column 111 of the bottom plate 110 via the positioning hole 1512a to fix the relative position between the fixer 151 and the positioning column 111.

In an embodiment, the pressing plate 1511 and the positioning column 1512 can be integrally formed in one piece. In terms of the manufacturing process, the pressing plate 1511 and the positioning column 1512 can be concurrently formed by stamping a sheet metal. In terms of the material, the pressing plate 1511 and the positioning column 1512 can be formed of metal, such as galvanized steel or stainless steel.

As indicated in FIGS. 3 and 4, the fixer 151 further includes a fixing column 1513, which is protruded from the pressing plate 1511. For example, the fixing column 1513 is protruded with respect to the first surface 1511s1 of the pressing plate 1511. The fixing column 1513 is provided with a first end surface 1513s1 and a second end surface 1513s2 opposite to the first end surface 1513s1. The second end surface 1513s2 of the fixing column 1513 is interposed between the first surface 140s1 and the first end surface 1513s1. In other words, the entire fixing column 1513 is located under the first surface 140s1 of the backlight module 140 (in terms of the orientation of FIG. 3), but does not pass through the backlight module 140. Since the fixing column 1513 does not pass through the backlight module 140, the fixing column 1513 will not block the light laterally transmitted in the backlight module 140. In an embodiment, the fixing column 1513 is provided with a female thread engaged with the fixing member 12. Specifically, the fixing column 1513 can be a stud. In an embodiment, the fixing column 1513 and the pressing plate 1511 can be separately manufactured and then are coupled, soldered or adhered together for good.

As indicated in FIG. 3, the fixing portion 152 is connected to the positioning column 111 of the bottom plate 110. In the present embodiment, the fixing portion 152 and the positioning column 111 of the bottom plate 110 can be integrally formed in one piece. In the present embodiment, the fixing portion 152 is a deflected portion of the bottom plate 110 and can be formed using a bending method or an extruding method. In a manufacturing method of the keyboard 10, before the fixing portion 152 is formed, the fixer 151 can be firstly mounted on a column of the bottom plate 110 (the column is an un-bent positioning column 111) to limit (fix or stabilize) the relative position between the fixer 151 and the positioning column 111. Then, the fixing portion 152 is deflected and formed at the terminal end of the column using the bending method or the extruding method to the press the fixer 151. The non-deflected portion of the column is defined as the positioning column 111.

Figure 5:
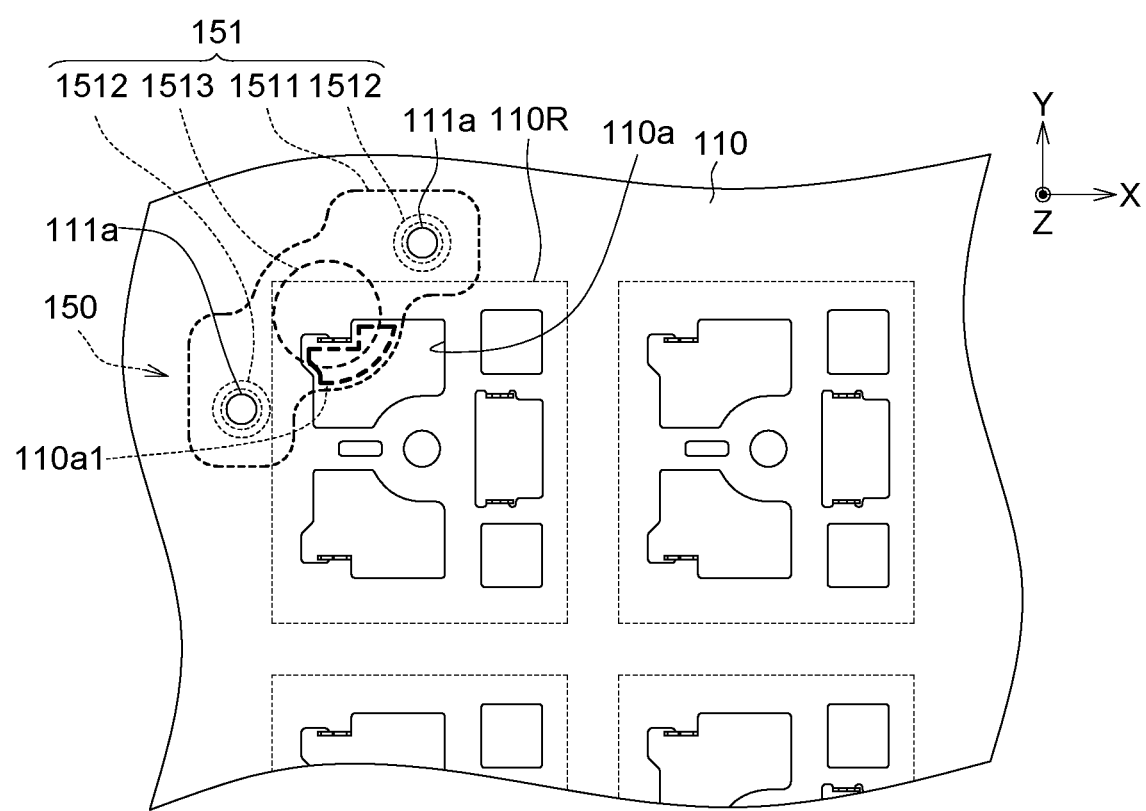
FIG. 5 is a top view of the bottom plate of FIG. 2.

As indicated in FIG. 5, the bottom plate 110 defines at least one keycap region 110R. The keycap 120 substantially corresponds to the keycap region 110R of the bottom plate 110. The bottom plate 110 is provided with at least one light hole 110a, through which the light emitted from the backlight module 140 (illustrated in FIG. 2) is outputted to the keycap 120 (illustrated in FIG. 2). Although it is not illustrated in the diagram, the thin-film switch layer 145 is provided with at least one light hole(illustrated in FIG. 2), which overlaps with the light hole 110a of the bottom plate 110 along the Z-axial direction. Thus, the light emitted from the backlight module 140 can be outputted to the keycap 120 via the light hole 110a of the bottom plate 110 and the light hole of the thin-film switch layer 145.

As indicated in FIG. 5, the positioning column 1512 of the fixer 151 and the light hole 110a of the bottom plate 110 do not overlap along the lifting direction of the lifting mechanism 130 (such as along the Z-axial direction). Or, the positioning column 1512 and the keycap region 110R do not overlap along the lifting direction of the lifting mechanism 130. That is, the positioning column 1512 is located outside the keycap region 110R (or the region of the light hole 110a). Thus, the positioning column 1512 will not prevent the light laterally transmitted in the backlight module 140 (such as along the XY direction) from being outputted via the light hole 110a.

As indicated in FIG. 5, the light hole 110a of the bottom plate 110 and the fixer 151 partly overlap along the Z-axial direction. For example, the light hole 110a partly overlaps with the pressing plate 1511 and the fixing column 1513 of the fixer 151 along the Z-axial direction (such as the overlapping region 110a1). Since the fixer 151 overlaps with the light hole 110a of the bottom plate 110 along the Z-axial direction but does not pass through the backlight module 140, the light transmitted in the backlight module 140 will not be blocked by the fixer 151 and still can be outputted to the keycap 120 from the overlapping region 110a1. In an embodiment, the overlapping region 110a1 and the light transmitting portion 122 (illustrated in FIG. 2) of the keycap 120 overlap along the Z-axial direction, and the light transmitted in the backlight module 140 can be directly outputted to the light transmitting portion 122 via the overlapping region 110a1.

Although the quantity of the fixer 151 is exemplified by one in the above embodiments, the exemplification is not for limiting the quantity of the fixer 151 of the present invention. In another embodiment, the quantity of the fixer 151 can be pleural. The quantity and/or position of the fixer 151 depends on the design of the casing 11, and is not subjected to specific restrictions in the present invention. In the above embodiments, a fixer 151 is connected to two fixing portions 152. In another embodiment, a fixer 151 can be connected to one, three, or more fixing portions 152.

Figure 6A:
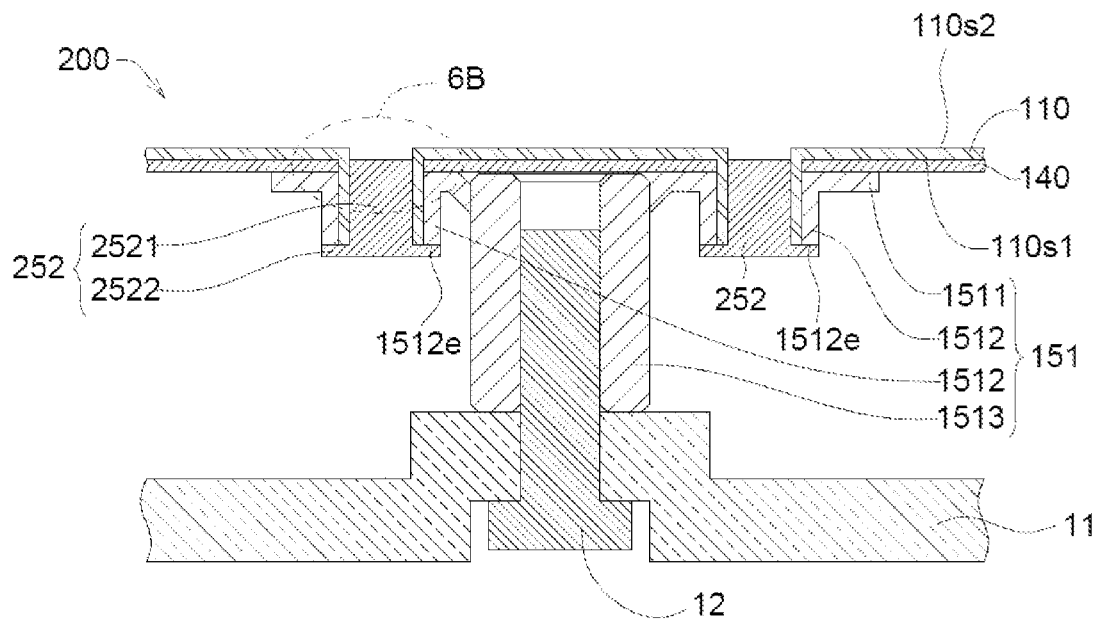
FIG. 6A is a partial cross-sectional view of a keyboard according to the present invention another embodiment.
Figure 6B:
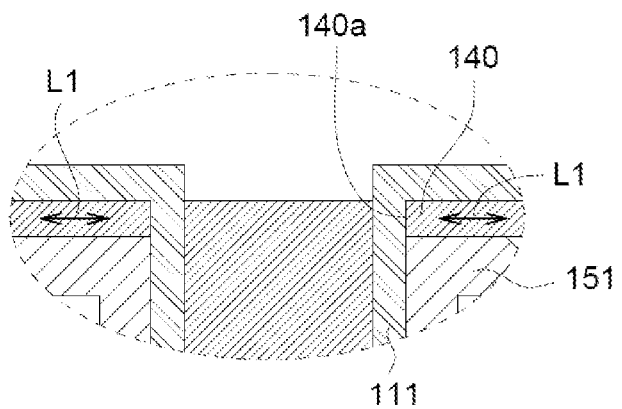
FIG. 6B is an enlarged view of a local portion 6B of FIG. 6A.

Referring to FIGS. 6A and 6B, FIG. 6A is a partial cross-sectional view of a keyboard 20 according to the present invention another embodiment, and FIG. 6B is an enlarged view of a local portion 6B of FIG. 6A.

The keyboard 20 includes a key structure 200, a casing 11 and at least one fixing member 12. The casing 11 and the key structure 200 are fixed by such as the fixing member 12. The key structure 200 includes a bottom plate 110, at least one keycap 120, at least one lifting mechanism 130 (not illustrated), and at least one elastomer 135 (not illustrated), a backlight module 140, a thin-film switch layer 145 (not illustrated), at least one fixer 151 and at least one fixing portion 252.

The key structure 200 of the present embodiment of the present invention and the key structure 100 of the above embodiments have similar or identical features but are different in that the structures of the fixer 151 and the fixing portion 252 of the key structure 200 are different from that of the fixer 151 and the fixing portion 152 of the key structure 100.

In the present embodiment, the fixing portion 252 and the bottom plate 110 are not integrally formed in one piece. Instead, the fixing portion 252 and the bottom plate 110 are separately manufactured and then are combined together. The fixing portion 252 passes through the bottom plate 110 and the backlight module 140. For example, the fixer 252 includes a penetrating portion 2521 and a first pressing portion 2522. The penetrating portion 2521 connects the first pressing portion 2522, and passes through the through hole 140a of the backlight module 140 and the bottom plate 110. For example, the penetrating portion 2521 passes through the positioning hole 111a of the positioning column 111 of the bottom plate 110. The pressing portion 2522 presses the fixer 251. For example, the pressing portion 2522 presses the end surface 1512e of the positioning column 1512 of the fixer 151. Thus, the fixing portion 252 can press the fixer 151 on the bottom plate 110.

In the present embodiment, the fixing portion 252 is a rivet, which rivets the bottom plate 110 and the fixer 151. In another embodiment, the fixing portion 252 is a screw element, such as screw or bolt provided with thread. The fixing portion 252 can be screwed on the bottom plate 110. For example, the fixing portion 252 is a screw element provided with male thread, and the positioning column 111 of the bottom plate 110 is provided with female thread. Through the engagement of the male thread and the female thread, the fixing portion 252 can press the fixer 151 on the bottom plate 110 to fix the relative position between the bottom plate 110 and the fixer 151. Moreover, the fixing portion 252 can be formed of metal or plastics.

In the present embodiment as indicated in FIGS. 6A and 6B, the fixing portion 252 is recessed with respect to the second surface 110s2 of the bottom plate 110. That is, the fixing portion 252 is protruded not over the second surface 110s2 of the bottom plate 110. In another embodiment, the fixing portion 252 is protruded with respect to the second surface 110s2 of the bottom plate 110. That is, the fixing portion 252 passes through the second surface 110s2 of the bottom plate 110. In the present example, the fixing portion 252 can be formed using an in-mold injection molding technology, and the fixing portion 252 is formed of plastics.

Figure 7A:
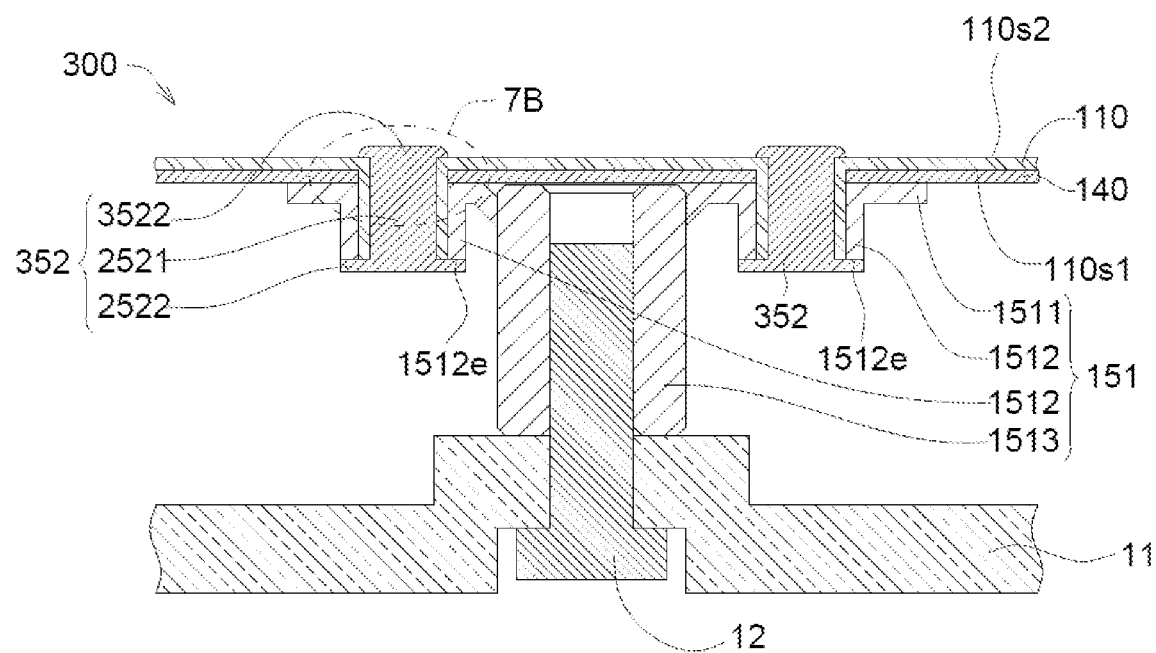
FIG. 7A is a partial cross-sectional view of a keyboard according to the present invention another embodiment.
Figure 7B:
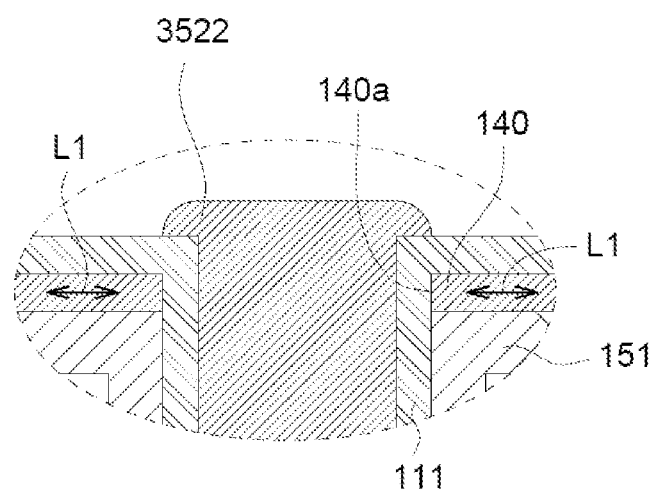
FIG. 7B is an enlarged view of a local portion 7B of FIG. 7A.

Referring to FIGS. 7A and 7B, FIG. 7A is a partial cross-sectional view of a keyboard 30 according to the present invention another embodiment, and FIG. 7B is an enlarged view of a local portion 7B of FIG. 7A.

The keyboard 30 includes a key structure 200, a casing 11 and at least one fixing member 12. The casing 11 and the key structure 200 are fixed by such as the fixing member 12. The key structure 300 includes a bottom plate 110, at least one keycap 120, at least one lifting mechanism 130 (not illustrated), and at least one elastomer 135 (not illustrated), a backlight module 140, a thin-film switch layer 145 (not illustrated), at least one fixer 151 and at least one fixing portion 352.

The key structure 300 of the present embodiment of the present invention and the key structure 200 of the above embodiments have similar or identical features but are different in that the structure of the fixing portion 352 of the key structure 300 is different from that of the fixing portion 252 of the key structure 200.

In the present embodiment, the fixing portion 352 passes through the bottom plate 110 and the backlight module 140. For example, the fixing portion 352 includes a penetrating portion 2521, a first pressing portion 2522 and a second pressing portion 3522. The penetrating portion 2521 connects the first pressing portion 2522 and the second pressing portion 3522, and the penetrating portion 2521 passes through the through hole 140a of the backlight module 140 and the bottom plate 110. For example, the penetrating portion 2521 passes through the positioning hole 111a of the positioning column 111 of the bottom plate 110. The first pressing portion 2522 presses the fixer 151. For example, the first pressing portion 2522 presses the end surface 1512e of the positioning column 1512 of the fixer 151. The second pressing portion 3522 presses the bottom plate 110. For example, the second pressing portion 3522 presses the second surface 110s2 of the bottom plate 110. Thus, the fixing portion 352 can press the fixer 151 on the bottom plate 110.

In the present embodiment, the fixing portion 352 is a rivet, which rivets the bottom plate 110 and the fixer 151, and the fixing portion 352 is formed of metal or plastics. In another embodiment, the fixing portion 352 is formed of plastics using the in-mold injection molding technology.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key structure, comprising:
   a bottom plate;
   a keycap;
   a lifting mechanism configured to pivotally connect the bottom plate and the keycap;
   a backlight module disposed on the bottom plate and provided with a through hole, a first surface and a second surface opposite to the first surface, wherein the through hole is extended to the second surface from the first surface;
   a fixer pressing the first surface; and
   a fixing portion configured to press the fixer on the bottom plate;
   wherein the fixing portion comprises a penetrating portion and a first pressing portion; the penetrating portion is connected to the first pressing portion and passes through the through hole of the backlight module and the bottom plate, and the first pressing portion presses the fixer; and
   wherein the fixing portion further comprises a second pressing portion, the penetrating portion is connected to the first pressing portion and the second pressing portion, and the second pressing portion presses the bottom plate.

2. The key structure according to claim 1, wherein the fixing portion and the bottom plate are integrally formed in one piece.

3. The key structure according to claim 1, wherein the bottom plate comprises a positioning column provided with a positioning hole; the positioning column passes through the through hole of the backlight module, and the fixing portion passes through the positioning hole of the positioning column.

4. The key structure according to claim 1, wherein the fixer further comprises a pressing plate and a positioning column, the pressing plate presses the first surface, and the positioning column is protruded from the pressing plate; the pressing plate is provided with a first surface and a second surface opposite to the first surface, the second surface of the pressing plate presses the first surface of the backlight module, and the positioning column is protruded with respect to the first surface of the pressing plate.

5. The key structure according to claim 4, wherein the entire second surface of the pressing plate presses the first surface of the backlight module.

6. The key structure according to claim 1, wherein the fixer further comprises a pressing plate and a fixing column, the pressing plate presses the first surface, the fixing column is protruded from the pressing plate, the fixing column is provided with a first end surface and a second end surface opposite to the first end surface, and the second end surface of the fixing column is interposed between the first surface of the backlight module and the first end surface.

7. The key structure according to claim 1, wherein the bottom plate is provided with a light hole, which partly overlaps the fixer along the lifting direction of the lifting mechanism.

8. The key structure according to claim 1, wherein the fixer further comprises a pressing plate and a positioning column, the bottom plate is provided with a light hole, the pressing plate presses the first surface, the positioning column passes through the backlight module, and the positioning column and the light hole do not overlap along the lifting direction of the lifting mechanism.

9. The key structure according to claim 1, wherein the entire fixer is located beside the first surface of the backlight module.

10. The key structure according to claim 1, wherein the bottom plate is provided with a first surface and a second surface opposite to the first surface, the backlight module is disposed on the first surface of the bottom plate by the second surface, and the fixing portion is recessed with respect to the second surface of the bottom plate.

11. A keyboard, comprising:
    a key structure, comprising:
    a bottom plate;
    a keycap;
    a lifting mechanism configured to pivotally connect the bottom plate and the keycap;
    a backlight module disposed on the bottom plate and provided with a through hole, a first surface and a second surface opposite to the first surface, wherein the through hole is extended to the second surface from the first surface;
    a fixer pressing the first surface; and
    a fixing portion configured to press the fixer on the bottom plate;
    a casing; and
    a fixing member configured to fix the casing and the fixer of the key structure;
    wherein the fixing portion comprises a penetrating portion and a first pressing portion; the penetrating portion is connected to the first pressing portion and passes through the through hole of the backlight module and the bottom plate, and the first pressing portion presses the fixer; and
    wherein the fixing portion further comprises a second pressing portion, the penetrating portion is connected to the first pressing portion and the second pressing portion, and the second pressing portion presses the bottom plate.

12. The keyboard according to claim 11, wherein the fixing portion and the bottom plate are integrally formed in one piece.

13. The keyboard according to claim 11, wherein the bottom plate comprises a positioning column provided with a positioning hole; the positioning column passes through the through hole of the backlight module, and the fixing portion passes through the positioning hole of the positioning column.

14. The keyboard according to claim 11, wherein the fixer further comprises a pressing plate and a positioning column, the pressing plate presses the first surface, and the positioning column is protruded from the pressing plate; the pressing plate is provided with a first surface and a second surface opposite to the first surface, the second surface of the pressing plate presses the first surface of the backlight module, and the positioning column is protruded with respect to the first surface of the pressing plate.

15. The keyboard according to claim 14, wherein the entire second surface of the pressing plate presses the first surface of the backlight module.

16. The keyboard according to claim 11, wherein the fixer further comprises a pressing plate and a fixing column, the pressing plate presses the first surface, the fixing column is protruded from the pressing plate, the fixing column is provided with a first end surface and a second end surface opposite to the first end surface, and the second end surface of the fixing column is interposed between the first surface of the backlight module and the first end surface.

* * * * *